July 30, 1946. W. F. AYCOCK 2,404,898
TRAILER STRUCTURE
Filed July 1, 1944
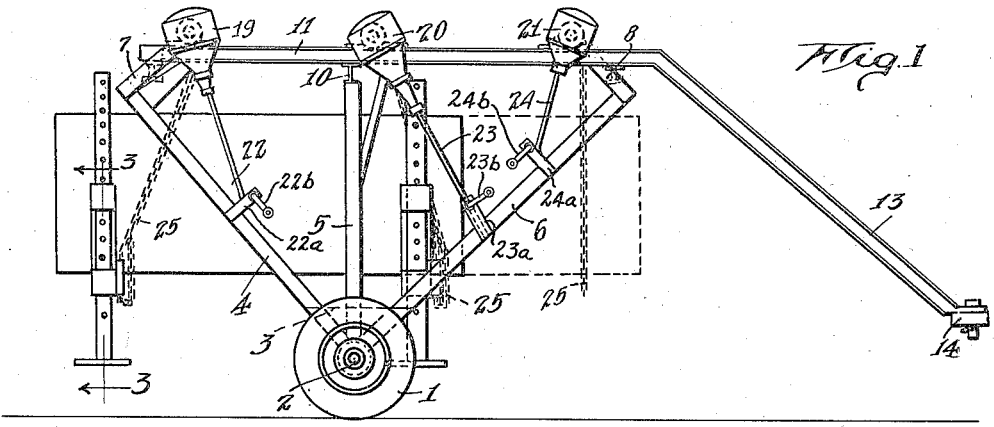
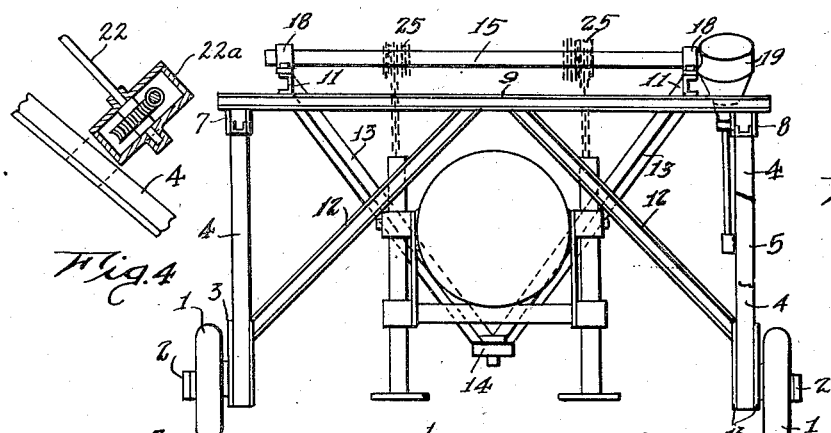
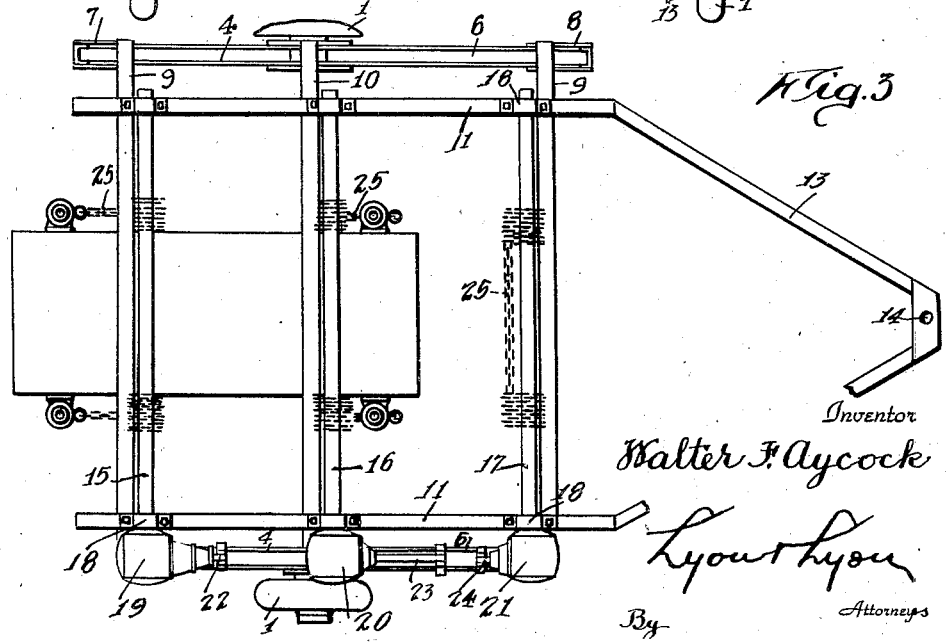
Inventor
Walter F. Aycock
By Lyon & Lyon
Attorneys Patented July 30, 1946

2,404,898

UNITED STATES PATENT OFFICE 2,404,898

TRAILER STRUCTURE

Walter F. Aycock, El Centro, Calif.

Application July 1, 1944, Serial No. 543,131

2 Claims. (Cl. 212—142)

My invention relates to trailer structures, and more particularly to trailer structures adapted to transport to the point of use relatively large tanks employed to dispense liquid fertilizer into irrigation streams.

An object of my invention is to provide a trailer structure which may be drawn or backed over the tank as it rests on its supports, and raise the tank into the trailer structure for transportation.

A further object is to provide a trailer structure which holds the tank in position while its supports are adjusted to the irregularities of the ground on which it is desired to position the tank.

A still further object is to provide a trailer structure which is particularly simple and economical of construction.

Further objects of the invention will appear hereinafter.

The invention consists in the novel parts and combination of parts to be described hereinafter, all of which contribute to produce an efficient trailer structure.

A preferred embodiment of the invention is described in the following specification, while the broad scope of the invention is pointed out in the appended claims.

In the drawing:

Fig. 1 is a side view of my trailer showing a tank suspended therein;

Fig. 2 is an end view thereof; and

Fig. 3 is a plan view thereof with the tank omitted.

Fig. 4 is an enlarged fragmentary sectional view of one of the gear boxes.

The trailer structure is mounted on a pair of wheels 1 by means of stub shafts 2 extending laterally from triangular gusset plates 3. Struts 4, 5 and 6 diverge upwardly from each gusset plate 3. The forward and rearward diverging struts 4 and 6 are provided with inturned elbow sections 7 and 8 at their upper extremities. The middle strut 5 extends vertically upwardly. The pairs of struts 4 and 6 are connected by their elbow sections 7 and 8 by cross members 9, while the pair of struts 5 are joined by a cross member 10. Longitudinally extending chassis frame members 11 connect the cross members near their junctures with the struts 4, 5 and 6. Each chassis frame member and struts 4, 5 and 6 form a side frame of triangular form. Angular braces 12 extend between the middle struts 5 and the cross member 10 to hold the side frames vertically. The forward ends of the chasis frame members 11 converge downwardly and forwardly to form towing arms 13 which connect at their forward lower extremities and are here provided with a suitable trailer hitch 14.

Elevating shafts 15, 16 and 17 extend across the rear central and forward portions of the chassis frame members, and are journaled thereon in bearings 18. The elevating shafts are driven by gear units 19, 20 and 21 respectively positioned outboard of the side frames 11. Each gear unit is conventional; that is, it comprises a housing containing bevel gears or other conventional gears to provide right angularly related driven and driving sides. The driven sides are connected to the shafts 15, 16 and 17, respectively, while the driving sides are connected with drive shafts 22, 23, and 24, respectively. The drive shafts extend down the sides of one of the frames comprising struts 4, 5 and 6, and are joined to conventional gear boxes 22a, 23a and 24a, respectively, preferably containing a worm and worm gear as shown in Fig. 4. The worms of the gear boxes are driven by crank handles 22b, 23b and 24b, respectively. The gear box 22a is secured to strut 4, while the gear boxes 23a and 24a are suitably secured to struts 6. Chains 25, ropes, or cables, are wrapped around the elevating shafts 15, 16 and 17 preferably in paired lengths. The extremities of such chains or the like, are adapted to be connected to the object to be hauled; in this case, a tank, so that the tank may be raised upwardly between the side frames and suspended from the elevating shafts for transportation.

The foregoing trailer is particularly designed to hold relatively large capacity tanks adapted to contain liquid fertilizer. These tanks must be transported into a position adjacent an irrigation stream for the purpose of metering their contents into such stream. The trailer is adapted to be drawn over the tank when the tank is setting on the ground. The chains are attached to the tank to raise it from the ground for transportation. Thus the tank may be readily picked up and moved about as need arises. For smaller tanks only two of the elevating shafts need be used; for larger tanks all three elevating shafts are used.

Many other embodiments of this invention may be resorted to without departing from the spirit of the invention.

I claim:

1. A trailer structure for bulky objects, comprising: a pair of longitudinally extending parallel disposed chassis beams spaced an appreciable distance apart, the forward portions of said beams being bent downwardly and converging toward each other and joined together; cross members joining the parallel portions of said chassis beams; downwardly converging sets of struts secured to the extremities of the cross members and joined together at their lower extremities to form parallel and vertically disposed side frames; a wheel journaled outboard of the lower joined ends of each set of struts; a series of winch shafts extending transversely of said chassis beams spaced an appreciable distance apart; a pair of flexible hoisting members wrapped directly about each of said shafts near the chassis beams, one end of each hoisting member being secured to its shaft and the other end adapted to be attached to an object to be transported whereby said object may be suspended between said side frames and under said chassis beams; and means for operating said winch shafts individually to wind and unwind said pairs of flexible members.

2. A trailer structure for bulky objects, comprising: a pair of longitudinally extending parallel disposed chassis beams, the forward portions of said beams being bent downwardly and converging toward each other and joined together; cross members joining the parallel portions of said chassis beams; downwardly converging sets of struts secured to the extremities of the cross members and poined together at their lower extremities to form parallel and vertically disposed side frames the parallel portions of said chassis beams and said side frames being spaced apart an appreciable distance to straddle a bulky object; a wheel journaled outboard of the lower joined ends of each set of struts; a series of winch shafts extending transversely of said chassis beams and spaced apart longitudinally on said chassis beams appreciable distances; a pair of flexible hoisting elements wrapped about each of said shafts and adapted to be attached to an object to be transported whereby said object may be suspended between said side frames and under said chassis beams; crank handles carried by one of said side frames; and drive connections between each crank handle and winch shaft for winding and unwinding said hoisting elements in pairs.

WALTER F. AYCOCK.